United States Patent
Park et al.

(10) Patent No.: US 9,964,808 B2
(45) Date of Patent: May 8, 2018

(54) CURVED LIQUID CRYSTAL DISPLAY DEVICE

(71) Applicant: LG Display Co., Ltd., Seoul (KR)

(72) Inventors: Se-Hong Park, Paju-si (KR);
Hee-Young Chae, Paju-si (KR);
In-Yeong Kong, Paju-si (KR);
Jong-Sin Park, Goyang-si (KR);
Ja-Young Pyun, Seoul (KR);
Dong-Yoon Lee, Seoul (KR);
Jae-Woong Youn, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days. days.

(21) Appl. No.: 14/713,667

(22) Filed: May 15, 2015

(65) Prior Publication Data

US 2015/0362766 A1 Dec. 17, 2015

(30) Foreign Application Priority Data

Jun. 17, 2014 (KR) .................. 10-2014-0073752

(51) Int. Cl.
*G02F 1/1343* (2006.01)
*G02F 1/1337* (2006.01)

(52) U.S. Cl.
CPC ...... *G02F 1/1337* (2013.01); *G02F 1/134363* (2013.01); *G02F 2001/133738* (2013.01)

(58) Field of Classification Search
CPC ............. G02F 1/1337; G02F 1/134363; G02F 2001/133738
See application file for complete search history.

(56) References Cited

U.S. PATENT DOCUMENTS

| | | | | | |
|---|---|---|---|---|---|
| 6,133,970 | A * | 10/2000 | Hirakata | ............. | G02F 1/13363 349/117 |
| 6,184,957 | B1 * | 2/2001 | Mori | ................. | G02F 1/134363 349/117 |
| 6,774,974 | B1 * | 8/2004 | Matsuyama | ........ | G02F 1/13394 349/123 |
| 7,403,251 | B2 * | 7/2008 | Chen | ..................... | G02F 1/1393 349/123 |
| 7,414,689 | B2 * | 8/2008 | Yang | ................. | G02F 1/134363 349/141 |
| 9,091,885 | B1 * | 7/2015 | Zheng | ................... | G02F 1/1337 |
| 2007/0236640 | A1 * | 10/2007 | Kimura | ............. | G02F 1/134363 349/141 |

(Continued)

FOREIGN PATENT DOCUMENTS

| | | |
|---|---|---|
| CN | 101464582 A | 6/2009 |
| CN | 101750828 A | 6/2010 |
| JP | 09-258176 A | 10/1997 |

*Primary Examiner* — Donald Raleigh
(74) *Attorney, Agent, or Firm* — Dentons US LLP

(57) ABSTRACT

A curved liquid crystal display device may include first and second substrates having curved surfaces along a first direction; first and second alignment layers on inner surfaces of the first and second substrates, respectively; a liquid crystal layer between the first and second alignment layers; and a seal pattern in an edge area surrounding the liquid crystal layer between the first and second substrates, wherein the first and second alignment layers have an alignment direction substantially parallel with the first direction to orient liquid crystal molecules of the liquid crystal layer.

13 Claims, 14 Drawing Sheets

(56) References Cited

U.S. PATENT DOCUMENTS

| | | | | |
|---|---|---|---|---|
| 2010/0149445 A1* | 6/2010 | Lee | ................... | G02F 1/136286 |
| | | | | 349/38 |
| 2013/0258226 A1* | 10/2013 | Hasegawa | ......... | G02F 1/134363 |
| | | | | 349/42 |
| 2014/0176856 A1* | 6/2014 | Lee | ................... | G02F 1/133305 |
| | | | | 349/61 |
| 2014/0375936 A1* | 12/2014 | Park | ................... | G02F 1/13394 |
| | | | | 349/106 |
| 2015/0029449 A1* | 1/2015 | Woo | ................. | G02F 1/133512 |
| | | | | 349/110 |

* cited by examiner

CURVED LIQUID CRYSTAL DISPLAY DEVICE

The present application claims the benefit of Korean Patent Application No. 10-2014-0073752 filed in Korea on Jun. 17, 2014, which is hereby incorporated by reference for all purposes as if fully set forth herein for all purposes as if fully set forth herein.

BACKGROUND OF THE INVENTION

Field of the Invention

The present disclosure relates to a liquid crystal display (LCD) device, and more particularly, to a curved LCD device.

Discussion of the Related Art

With rapid development of information technologies, various types of display devices for displaying images have been required. Recently, flat panel display (FPD) devices such as liquid crystal display (LCD) devices, plasma display panel (PDP) devices and organic light emitting diode display (OLED) devices have been widely developed and applied to various fields.

Among these various types of FPD devices, LCD devices have been widely used because LCD devices have many advantages in weight, size and power consumption.

Generally, an LCD device includes two substrates, a liquid crystal layer therebetween, and pixel and common electrodes for driving liquid crystal molecules of the liquid crystal layer. When voltages are applied to the pixel and common electrodes, an electric field is induced between the electrodes, and the liquid crystal molecules are arranged by the electric field. The arrangement of the liquid crystal molecules varies depending on the electric field, and the transmittance of the light passing through the liquid crystal layer is controlled. Images can be displayed by controlling the light transmittance of the liquid crystal layer.

Such an LCD device has been widely used as portable equipment such as cellular phones and multimedia devices, monitors for notebook computers and desktop computers, and large-sized televisions. However, it may have a problem in that a distance from the main viewing point of a viewer to the screen of the LCD device varies depending on locations. This will be described with reference to FIG. 1.

FIG. 1 is a view of schematically illustrating an LCD device according to the related art.

In FIG. 1, since the LCD device 10 is a flat type, there is a difference between a first distance d1 from a main viewing point of a viewer to a center of the LCD device 10 and a second distance d2 from the main viewing point to a left or right side of the LCD device 10. Namely, the second distance d2 is greater than the first distance d1.

The distance deviation increases as the size of the LCD device 10 increases, and as the distance deviation increases, the viewer's sense of immersion to an image displayed by the LCD device 10 decreases.

SUMMARY OF THE INVENTION

Accordingly, the present invention is directed to a curved liquid crystal display (LCD) device that substantially obviates one or more of the problems due to limitations and disadvantages of the related art.

An advantage of the present invention is to provide a curved LCD device with improved sense of immersion.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a curved liquid crystal display (LCD) device may, for example, include first and second substrates having curved surfaces along a first direction; first and second alignment layers on inner surfaces of the first and second substrates, respectively; a liquid crystal layer between the first and second alignment layers; and a seal pattern in an edge area surrounding the liquid crystal layer between the first and second substrates, wherein the first and second alignment layers have an alignment direction substantially parallel with the first direction to orient liquid crystal molecules of the liquid crystal layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
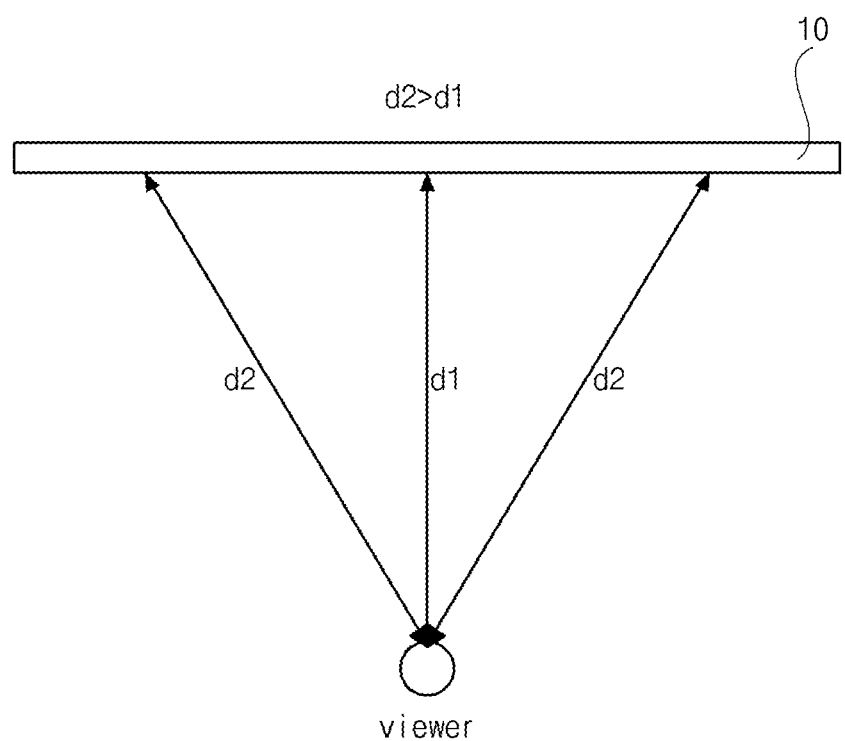
FIG. 1 is a view of schematically illustrating a liquid crystal display (LCD) device according to the related art.
Figure 2:
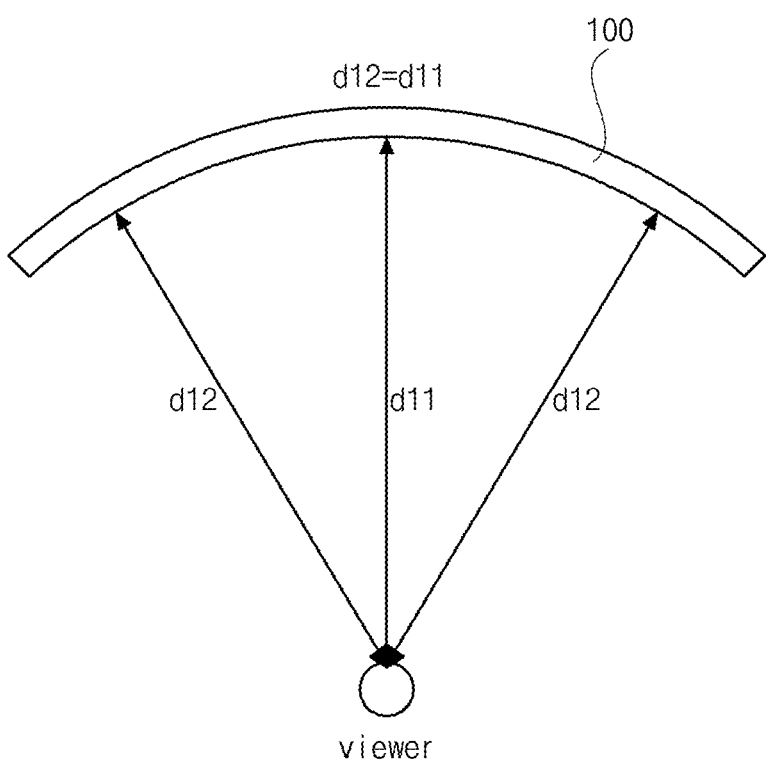
FIG. 2 is a schematic view of a curved LCD device according to the first embodiment of the present invention.

FIG. 2 is a schematic view of a curved liquid crystal display (LCD) device according to the first embodiment of the present invention.

As illustrated in FIG. 2, a curved LCD device 100 according to the first embodiment of the present invention has a curved shape. Namely, the LCD device 100 is curved by a predetermined curvature from a center of the LCD device 100 to thereby have a curved shape.

Accordingly, a first distance d11 from a main viewing point of a viewer to a center of the curved LCD device 100 is substantially equal to a second distance d12 from the main viewing point to a left or right side of the curved LCD device 100, with substantially no distance deviation. As a result, a sense of immersion of the viewer can be improved.

Figure 3:
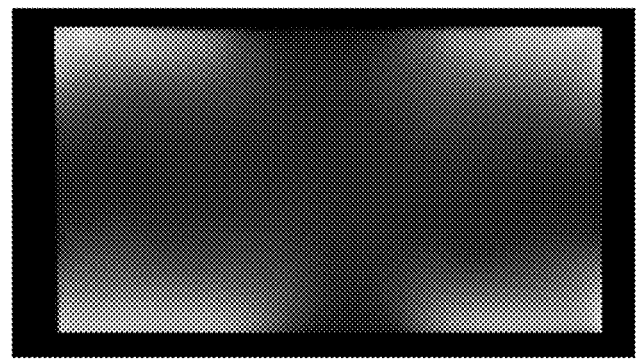
FIG. 3 is a view showing a light leakage in four corners of the LCD device according to the first embodiment of the present invention.

Meanwhile, as illustrated in FIG. 3, light leakage may occur in the four corners of the curved LCD device 100. The light leakage will be described with reference to FIGS. 4 to 7C.

Figure 4:
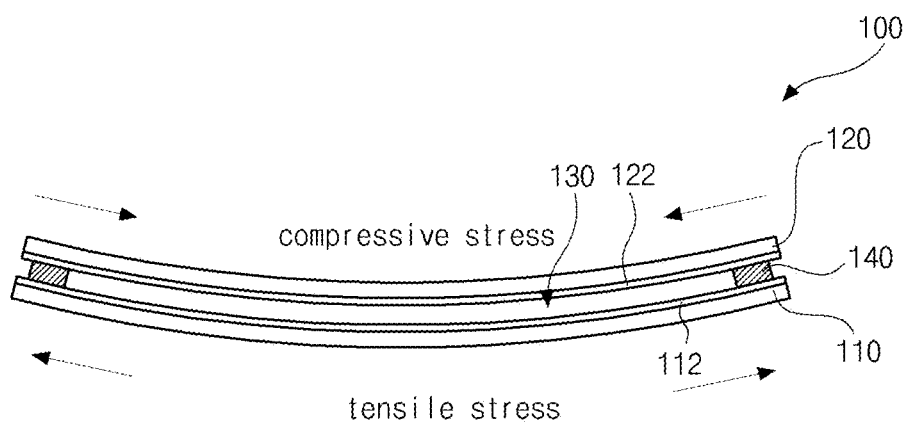
FIG. 4 is a schematic cross-sectional view of a curved LCD device according to the first embodiment of the present invention.

FIG. 4 is a schematic cross-sectional view of a curved LCD device according to the first embodiment of the present invention.

In FIG. 4, the curved LCD device 100 includes a first substrate 110, a second substrate 120, and a liquid crystal layer 130 between the first and second substrates 110 and 120. A seal pattern 140 is formed in edge areas between the first and second substrates 110 and 120 to prevent the liquid crystal layer 130 from leaking.

Although not shown in the figure, a gate line, a data line, a thin film transistor, and a pixel electrode are formed on an inner surface of the first substrate 110. The gate line and the data line cross each other to define a pixel region. The thin film transistor is electrically connected to the gate line and the data line. The pixel electrode is disposed in the pixel region and is electrically connected to the thin film transistor. In addition, a common electrode may be further formed on the inner surface of the first substrate 110. The common electrode and the pixel electrode generate an electric field when a voltage is applied. The first substrate 110 including these elements may be referred to as an array substrate.

In addition, although not shown in the figure, a black matrix and a color filter layer may be formed on an inner surface of the second substrate 120. The black matrix is placed to correspond to the gate line, the data line, and the thin film transistor. The black matrix has an opening corresponding to the pixel region and serves to block light outside the pixel region. The color filter layer corresponds to the opening of the black matrix and includes red, green and blue color filters. Each color filter corresponds to one pixel region. The second substrate 120 including the black matrix and the color filter layer may be referred to as a color filter substrate.

Meanwhile, first and second alignment layers 112 and 122 as top layers are formed on the inner surfaces of the first and second substrates 110 and 120, respectively. The first and second alignment layers 112 and 122 have predetermined alignment axes and determine an initial arrangement of liquid crystal molecules of the liquid crystal layer 130.

Additionally, first and second polarizers (not shown) are disposed at outer surfaces of the first and second substrates 110 and 120, respectively. A light-transmission axis of the first polarizer is perpendicular to a light-transmission axis of the second polarizer.

The curved LCD device 100 according to the first embodiment of the present invention is changed into a curved state from a flat state. For example, to attain a curved surface along a transverse direction of the display device, that is, a longer side direction, a flat LCD device is curved toward the second substrate 120 along the transverse direction with respect to the center of the device, and the curved LCD device 100 with a predetermined curvature is obtained.

Since the edge areas of the first and second substrates 110 and 120 are attached by the seal pattern 140, the first and second substrates 110 and 120 are subject to different forces with respect to the bending. Namely, in the curved LCD device 100, a tensile stress is applied to the first substrate 110, which is curved outside, along the transverse direction, and a compressive stress is applied to the second substrate 120, which is curved inside, along the transverse direction.

Also, since the edge areas of the first and second substrates 110 and 120 are fixed by the seal pattern 140, a torsional stress is generated in the edge areas of the first and second substrates 110 and 120, and the first and second substrates 110 and 120 are shifted oppositely. At this time, the torsional stress is highest in four corners of the first and second substrates 110 and 120. The alignment axes of the first and second alignment layers 112 and 122 may be twisted due to the torsional stress, and the arrangement of the liquid crystal molecules adjacent to the inner surfaces of the first and second substrates 110 and 120 may also be twisted. Thus, a light leakage may occur in the four corners of the first and second substrates 110 and 120.

Hereinafter, the arrangement of the liquid crystal molecules due to the torsional stress will be described in more detail.

Figure 5A:
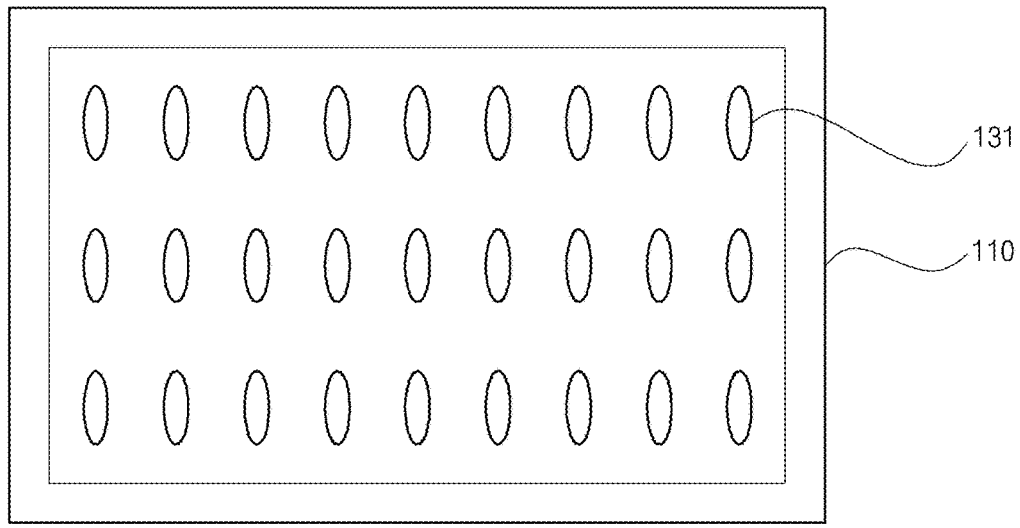
FIG. 5A and FIG. 5B are plan views schematically illustrating an arrangement of liquid crystal molecules on inner surfaces of first and second substrates in a flat state of a curved LCD device according to the first embodiment of the present invention, respectively.
Figure 5B:
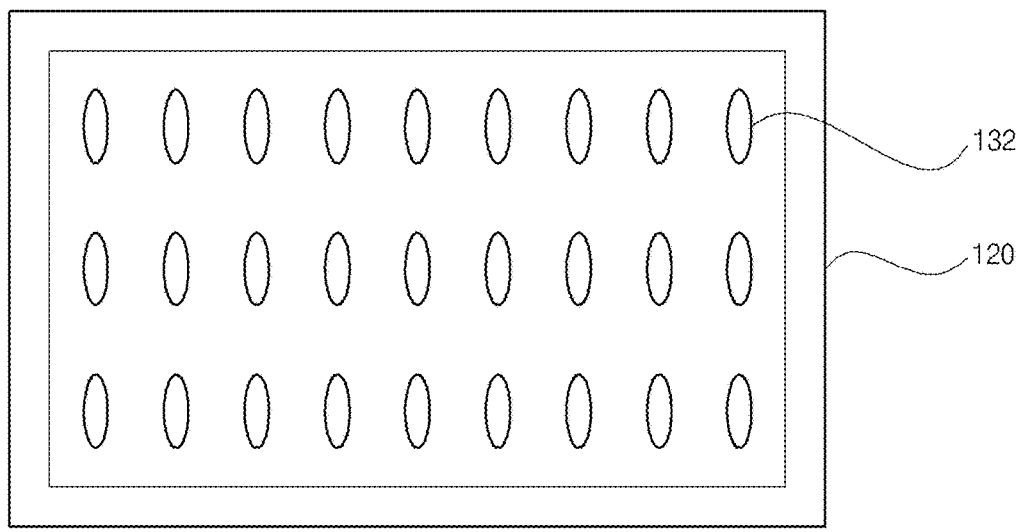
Figure 6A:
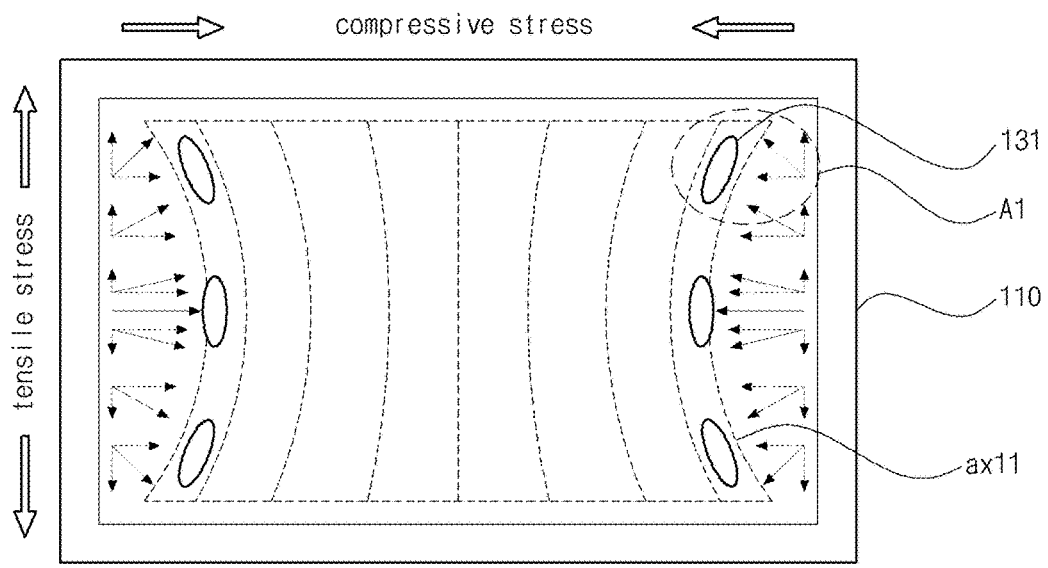
FIG. 6A and FIG. 6B are plan views schematically illustrating an arrangement of liquid crystal molecules on inner surfaces of first and second substrates in a curved state of a curved LCD device according to the first embodiment of the present invention, respectively.
Figure 6B:
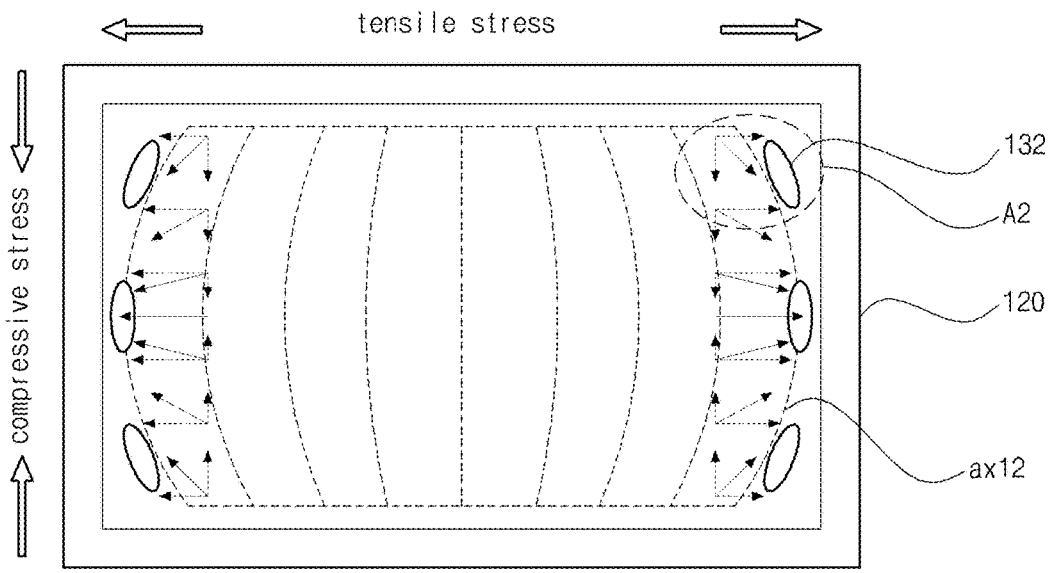

FIG. 5A and FIG. 5B are plan views schematically illustrating an arrangement of liquid crystal molecules on inner surfaces of first and second substrates in a flat state of a curved LCD device according to the first embodiment of the present invention, respectively. FIG. 6A and FIG. 6B are plan views schematically showing an arrangement of liquid crystal molecules on inner surfaces of first and second substrates in a curved state of a curved LCD device according to the first embodiment of the present invention, respectively.

As illustrated in FIG. 5A and FIG. 5B, in the flat state of the curved LCD device according to the first embodiment of the present invention, the liquid crystal molecules 131 and 132 are arranged on the inner surfaces of the first and second substrates 110 and 120 along a longitudinal direction of the display device, that is, a shorter side direction, such that the long axes of the liquid crystal molecules 131 and 132 are parallel to the longitudinal direction.

Namely, when a transverse direction of the display device is defined as a first direction and the longitudinal direction of the display device is defined as a second direction, the first and second alignment layers (not shown) respectively on the first and second substrates 110 and 120 may be rubbed in the second direction and have alignment axes along the second direction, and the liquid crystal molecules 131 and 132 are arranged along the second direction.

The LCD device in the flat state is curved toward the second substrate 120 along the first direction and is changed into a curved state. At this time, stresses applied to the first and second substrates 110 and 120 vary depending on the inner surfaces and the outer surfaces of the first and second substrates 110 and 120. A tensile stress is applied to the outer surface of the first substrate 110 and the inner surface of the second substrate 120, which are curved outside, and a compressive stress is applied to the inner surface of the first substrate 110 and the outer surface of the second substrate, which are curved inside.

Thus, in FIG. 6A, the compressive stress is applied to edges of the inner surface of the first substrate 110, which are parallel to the first direction, along the first direction. At this time, since the edges of the first substrate 110 are attached and fixed to edges of the second substrate 120 by the seal pattern 140 of FIG. 4, the tensile stress is applied to the edges of the inner surface of the first substrate 110, which are parallel to the second direction, along the second direction.

As a result, a torsional stress is generated in both sides of the edges of the inner surface of the first substrate 110 along the first direction due to the compressive stress of the first direction and the tensile stress of the second direction. The torsional stress is highest in four corners of the first substrate 110. A magnitude and a direction of the torsional stress are illustrated by a solid line arrow.

As illustrated in FIG. 6A, the alignment axis ax11 of the first alignment layer (not shown) on the first substrate 110 is curved due to the torsional stress such that the center of the alignment axis ax11 faces the inside of the first substrate 110. The arrangement of the liquid crystal molecules 131 is also curved, and the liquid crystal molecules 131 on the inner surface of the first substrate 110 are arranged to have a concave shape.

On the other hand, in FIG. 6B, the tensile stress is applied to the edges of the inner surface of the second substrate 120, which are parallel to the first direction, along the first direction, and the compressive stress is applied to the edges of the inner surface of the second substrate 120, which are parallel to the second direction, along the second direction.

Therefore, a torsional stress is generated in both sides of the edges of the inner surface of the second substrate 120 along the first direction due to the tensile stress of the first direction and the compressive stress of the second direction. The torsional stress is highest in four corners of the second substrate 120. A magnitude and a direction of the torsional stress are illustrated by a solid line arrow.

As illustrated in FIG. 6B, the alignment axis ax12 of the second alignment layer (not shown) on the second substrate 120 is curved due to the torsional stress such that the center of the alignment axis ax12 faces the outside of the second substrate 120. The arrangement of the liquid crystal molecules 132 is also curved, and the liquid crystal molecules 132 on the inner surface of the second substrate 120 are arranged to have a convex shape.

Figure 7A:
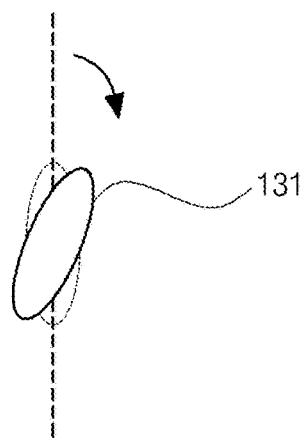
FIG. 7A is a view illustrating an arrangement of a liquid crystal molecule in a region A1 of FIG. 6A.
Figure 7B:
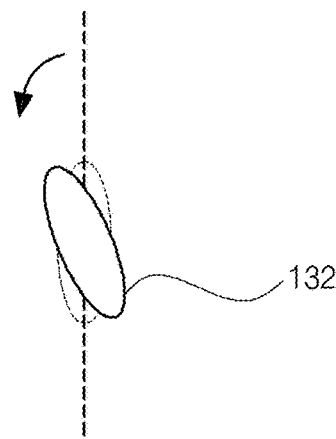
FIG. 7B is a view illustrating an arrangement of a liquid crystal molecule in a region A2 of FIG. 6B.
Figure 7C:
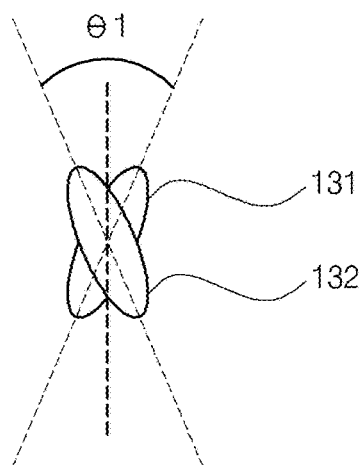
FIG. 7C is a view illustrating together the arrangements of the liquid crystal molecules of FIG. 7A and FIG. 7B.

FIG. 7A is a view illustrating an arrangement of a liquid crystal molecule in a region A1 of FIG. 6A, FIG. 7B is a view illustrating an arrangement of a liquid crystal molecule in a region A2 of FIG. 6B, and FIG. 7C is a view illustrating together the arrangements of the liquid crystal molecules of FIG. 7A and FIG. 7B.

As illustrated in FIG. 7A, in the curved LCD device according to the first embodiment of the present invention, the liquid crystal molecule 131 on the inner surface of the first substrate 110 of FIG. 6A rotates clockwise with respect to the initial alignment axis. As illustrated in FIG. 7B, in the curved LCD device according to the first embodiment of the present invention, the liquid crystal molecule 132 on the inner surface of the second substrate 120 of FIG. 6B rotates counterclockwise with respect to the initial alignment axis.

At this time, since the initial arrangement direction of the liquid crystal molecules 131 and 132 is perpendicular to the curved direction of the curved LCD device according to the first embodiment of the present invention, lengths along the long axes of the liquid crystal molecules 131 and 132 become a moment arm. Thus, the moment is relatively large, and the liquid crystal molecules 131 and 132 rotate with a larger rotation angle.

As a result, as illustrated in FIG. 7C, the liquid crystal molecule 131 on the inner surface of the first substrate 110 of FIG. 6A and the liquid crystal molecule 132 on the inner surface of the second substrate 120 of FIG. 6B are twisted and arranged to have a first angle θ1 therebetween.

The twisted arrangement of the liquid crystal molecules 131 and 132 causes light leakage.

In the meantime, an initial light leakage may be prevented by annealing a flat LCD device for a long time to fabricate a curved LCD device. In the annealing method, the flat LCD device curves due to uniform shrinkage of the polarizers when the moisture in the polarizers is vaporized. However, when the curved LCD device is disposed under room temperature, it may be changed into the flat state again because the polarizers absorb moisture and expand.

At this time, a compressive stress is applied to the first substrate 110 of FIG. 6A along the first direction, and a tensile stress is applied to the second substrate 120 of FIG. 6B along the first direction. Thus, a torsional stress is generated in the edge areas of the first and second substrates 110 and 120 in an opposite direction to the torsional stress illustrated in FIG. 6A and FIG. 6B. The alignment axes of the first and second alignment layers are twisted due to the torsional stress, and the arrangement of the liquid crystal molecules adjacent to the inner surfaces of the first and second substrates 110 of FIG. 6A and 120 of FIG. 6B is twisted. As a result, a light leakage may occur in the four corners of the first and second substrates 110 of FIG. 6A and 120 of FIG. 6B.

Hereinafter, a curved LCD device for reducing or preventing light leakage will be described in detail.

Figure 8A:
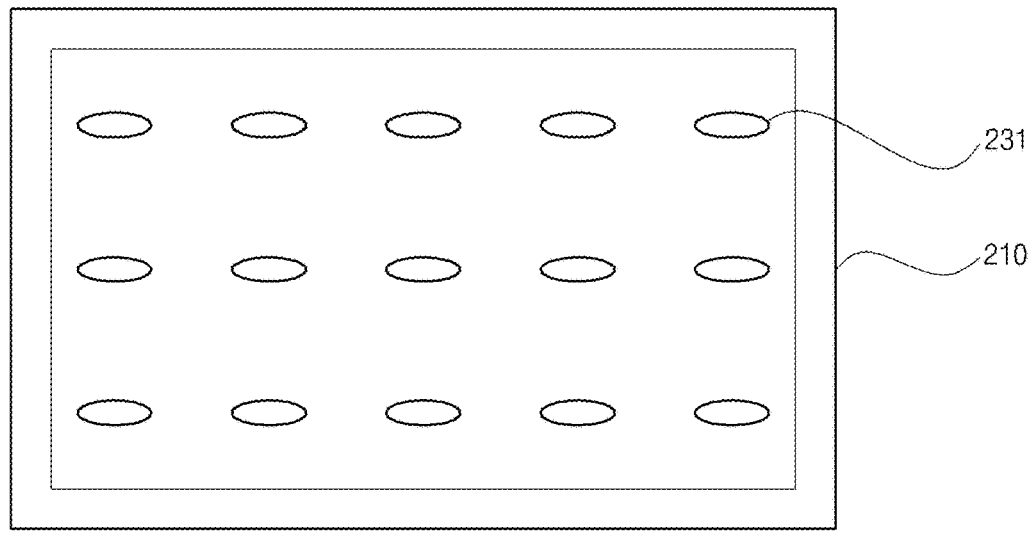
FIG. 8A and FIG. 8B are plan views schematically illustrating an arrangement of liquid crystal molecules on inner surfaces of first and second substrates in a flat state of a curved LCD device according to the second embodiment of the present invention, respectively.
Figure 8B:
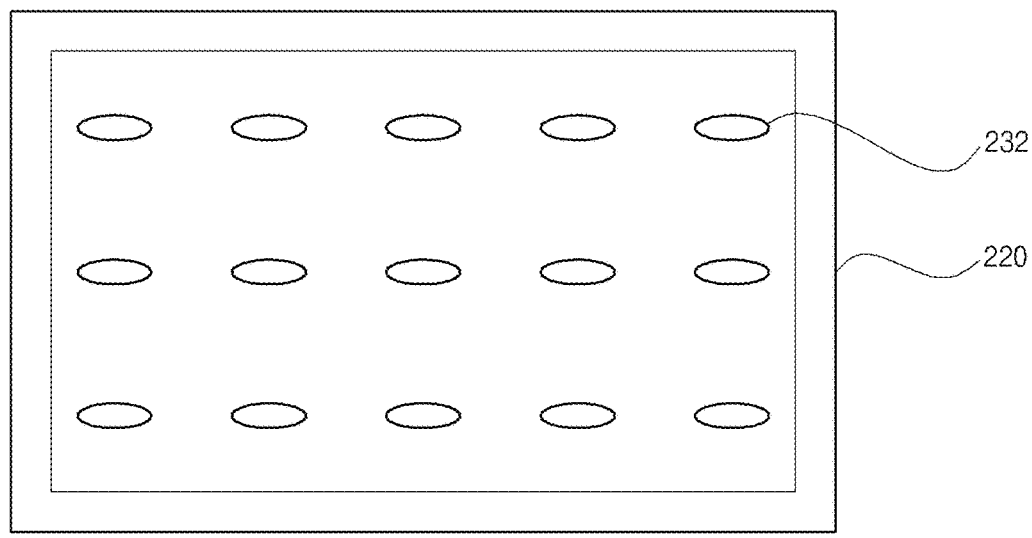
Figure 9A:
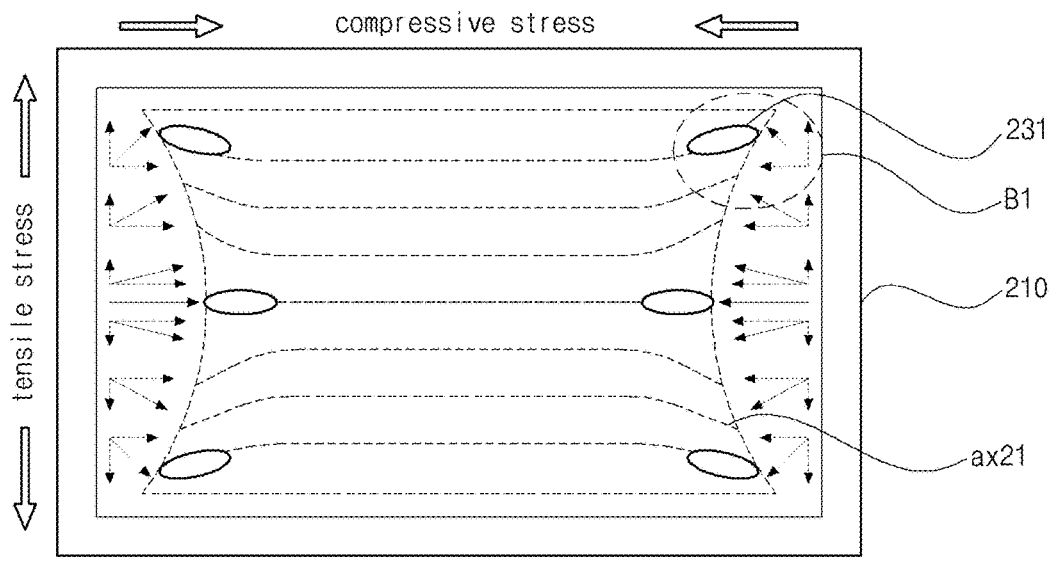
FIG. 9A and FIG. 9B are plan views schematically illustrating an arrangement of liquid crystal molecules on inner surfaces of first and second substrates in a curved state of a curved LCD device according to the second embodiment of the present invention, respectively.
Figure 9B:
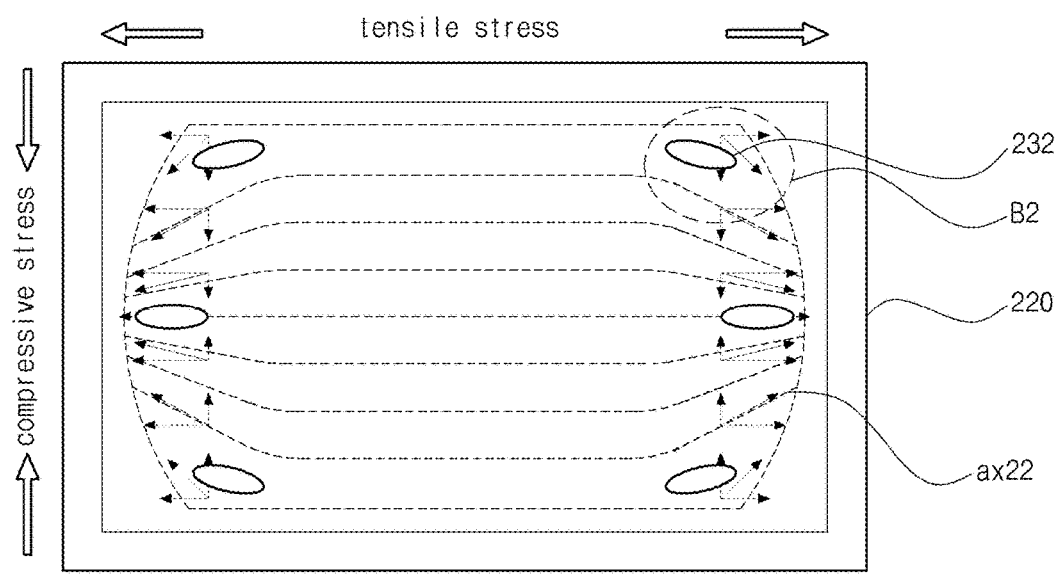
Figure 9C:
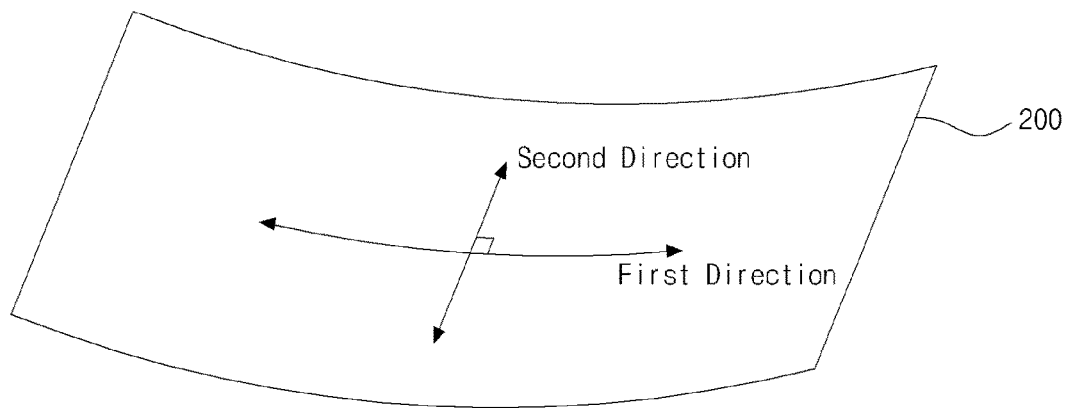
FIG. 9C is a view schematically illustrating a curved LCD device according to the second embodiment of the present invention.

FIG. 8A and FIG. 8B are plan views schematically illustrating an arrangement of liquid crystal molecules on inner surfaces of first and second substrates in a flat state of a curved LCD device according to the second embodiment of the present invention, respectively. FIG. 9A and FIG. 9B are plan views schematically illustrating an arrangement of liquid crystal molecules on inner surfaces of first and second substrates in a curved state of a curved LCD device according to the second embodiment of the present invention, respectively, and FIG. 9C is a view schematically illustrating a curved LCD device according to the second embodiment of the present invention.

As illustrated in FIG. 8A and FIG. 8B, in the flat state of the curved LCD device 200 according to the second embodiment of the present invention, the liquid crystal molecules 231 and 232 are arranged on the inner surfaces of the first and second substrates 210 and 220 along a transverse direction of the display device, that is, a longer side direction, such that the long axes of the liquid crystal molecules 231 and 232 are parallel to the transverse direction.

Namely, when the transverse direction of the display device 200 is defined as a first direction and a longitudinal direction of the display device 200 is defined as a second direction, the first and second alignment layers (not shown) respectively on the first and second substrates 210 and 220 may be rubbed in the first direction and have alignment axes along the first direction, and the liquid crystal molecules 231 and 232 are arranged along the first direction.

The LCD device in the flat state is curved toward the second substrate 220 along the first direction and is changed into a curved state. Accordingly, in the curved LCD device 200 according to the second embodiment of the present invention, an initial arrangement direction of the liquid crystal molecules 231, 232 is the same as and parallel to the curved direction of the curved LCD device 200.

When the LCD device in the flat state is curved toward the second substrate 220 along the first direction, in FIG. 9A, a compressive stress is applied to edges of the inner surface of the first substrate 210, which are parallel to the first direction. At this time, since the edges of the first substrate 210 are attached and fixed to edges of the second substrate 220 by a seal pattern (not shown), a tensile stress is applied to the edges of the inner surface of the first substrate 210, which are parallel to the second direction, along the second direction.

As a result, a torsional stress is generated in both sides of the edges of the inner surface of the first substrate 210 along the first direction due to the compressive stress of the first direction and the tensile stress of the second direction. The torsional stress is highest in four corners of the first substrate 210. A magnitude and a direction of the torsional stress are illustrated by a solid line arrow.

As illustrated in FIG. 9A, the alignment axis ax21 of the first alignment layer (not shown) on the first substrate 210 is curved due to the torsional stress such that both ends of the alignment axis ax21 faces the outside of the first substrate 210. The arrangement of the liquid crystal molecules 231 is also curved.

On the other hand, in FIG. 9B, the tensile stress is applied to the edges of the inner surface of the second substrate 220, which are parallel to the first direction, along the first direction, and the compressive stress is applied to the edges of the inner surface of the second substrate 220, which are parallel to the second direction, along the second direction.

As a result, a torsional stress is generated in both sides of the edges of the inner surface of the second substrate 220 along the first direction due to the tensile stress of the first direction and the compressive stress of the second direction. The torsional stress is highest in four corners of the second substrate 220. A magnitude and a direction of the torsional stress are shown by a solid line arrow.

As illustrated in FIG. 9B, the alignment axis ax22 of the second alignment layer (not shown) on the second substrate 220 is curved due to the torsional stress such that both ends of the alignment axis ax22 faces the inside of the second substrate 220. The arrangement of the liquid crystal molecules 232 is also curved.

Figure 10A:
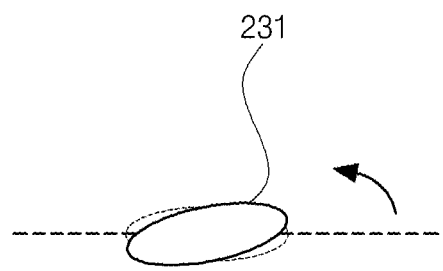
FIG. 10A is a view illustrating an arrangement of a liquid crystal molecule in a region B1 of FIG. 9A.
Figure 10B:
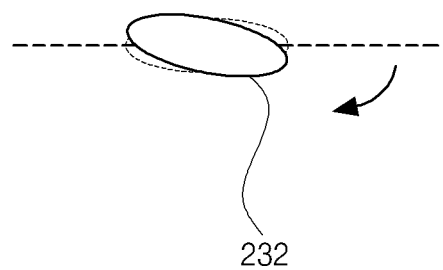
FIG. 10B is a view illustrating an arrangement of a liquid crystal molecule in a region B2 of FIG. 9B.
Figure 10C:
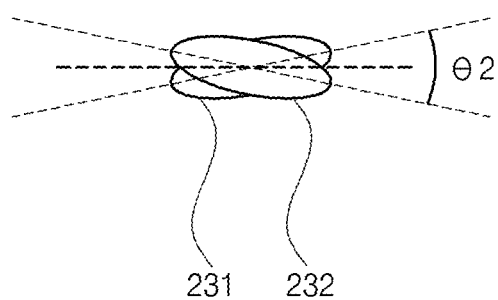
FIG. 10C is a view illustrating together the arrangements of the liquid crystal molecules of FIG. 10A and FIG. 10B.

FIG. 10A is a view illustrating an arrangement of a liquid crystal molecule in a region B1 of FIG. 9A, FIG. 10B is a view illustrating an arrangement of a liquid crystal molecule in a region B2 of FIG. 9B, and FIG. 10C is a view illustrating together the arrangements of the liquid crystal molecules of FIG. 10A and FIG. 10B.

As illustrated in FIG. 10A, in the curved LCD device according to the second embodiment of the present invention, the liquid crystal molecule 231 on the inner surface of the first substrate 210 of FIG. 9A rotates counterclockwise with respect to the initial alignment axis. As illustrated in FIG. 10B, in the curved LCD device according to the second embodiment of the present invention, the liquid crystal molecule 232 on the inner surface of the second substrate 220 of FIG. 9B rotates clockwise with respect to the initial alignment axis.

At this time, since the initial arrangement direction of the liquid crystal molecules 231 and 232 is parallel to the curved direction of the curved LCD device according to the second embodiment of the present invention, lengths along short axes of the liquid crystal molecules 231 and 232 become a moment arm. Thus, the moment in the second embodiment is small in comparison with the first embodiment, and the liquid crystal molecules 231 and 232 rotate with a smaller rotation angle.

As a result, as illustrated in FIG. 10C, the liquid crystal molecule 231 on the inner surface of the first substrate 210 of FIG. 9A and the liquid crystal molecule 232 on the inner surface of the second substrate 220 of FIG. 9B are twisted and arranged to have a second angle θ2 therebetween. The second angle θ2 is smaller than the first angle θ1 of FIG. 7C, and thus light leakage can be reduced.

Namely, in the curved LCD device according to the second embodiment of the present invention, the liquid crystal molecules 231 and 232 are initially arranged along the curved direction. Relatively weak stress is generated and applied, and the liquid crystal molecules 231 and 232 are twisted with a smaller twist angle. Thus, the twist angle between the liquid crystal molecules 231 and 232 in the curved LCD device according to the second embodiment of the present invention, the second angle θ2, is smaller than the twist angle between the liquid crystal molecules 131 and 132 in the curved LCD device according to the first embodiment of the present invention, the first angle θ1, and light leakage can be reduced.

In the curved LCD device according to the second embodiment of the present invention, the liquid crystal molecules may have a positive dielectric anisotropy. When a voltage is applied to the pixel electrode and the common electrode and an electric field is generated between the pixel electrode and the common electrode, the liquid crystal molecules may be arranged along a direction of the electric field.

A pixel structure of a curved LCD device according to the second embodiment of the present invention will be described with reference to FIG. 11A and FIG. 11B.

Figure 11A:
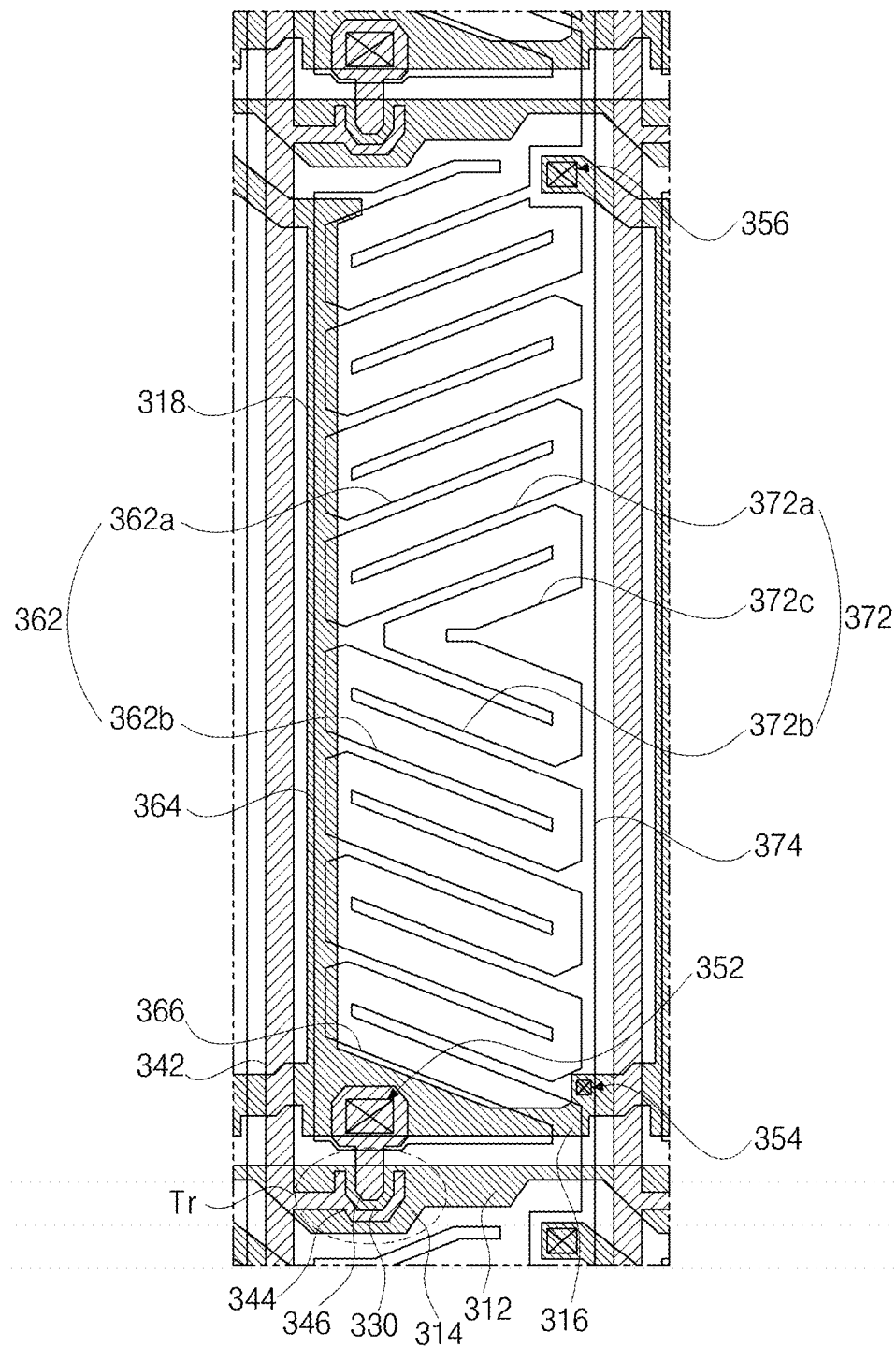
FIG. 11A and FIG. 11B are plan views illustrating a pixel structure of a curved LCD device according to the second embodiment of the present invention.
Figure 11B:
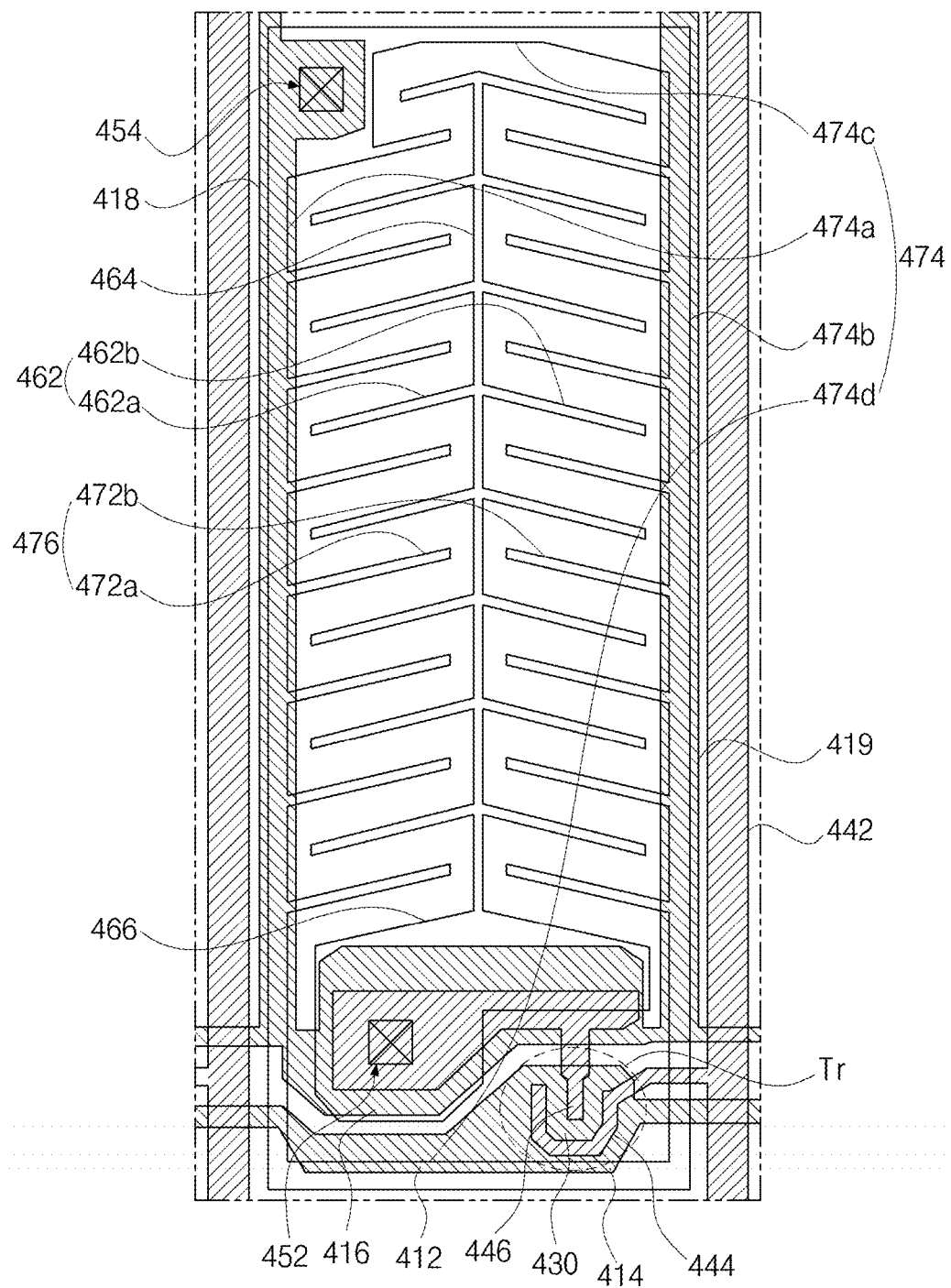

FIG. 11A and FIG. 11B are plan views illustrating a pixel structure of a curved LCD device according to the second embodiment of the present invention.

In FIG. 11A, a gate line 312 is formed in a first direction, and a data line 342 is formed in a second direction perpendicular to the first direction. The gate line 312 and the data line 342 cross each other to define a pixel region.

A thin film transistor Tr is formed at a crossing portion of the gate line 312 and the data line 342 and is connected to the gate line 312 and the data line 342. The thin film transistor Tr includes a gate electrode 314, a semiconductor layer 330, a source electrode 344 and a drain electrode 346.

The gate electrode 314 is connected to the gate line 312. The gate electrode 314 may be part of the gate line 312 as illustrated in the figure, or the gate electrode 314 may be extended from the gate line 312. The semiconductor layer 330 is disposed between the gate electrode 314 and the source and drain electrodes 344 and 346. The semiconductor layer 330 may include an active layer of intrinsic amorphous silicon and ohmic contact layers of impurity-doped amorphous silicon. Alternatively, the semiconductor layer 330 may be formed of polycrystalline silicon. The source electrode 344 is connected to the data line 342. The source electrode 344 may be extended from the data line 342 with a U-like shape as shown in the figure, or the source electrode 344 may be part of the data line 342. The drain electrode 346 is spaced apart from the source electrode 344 over the semiconductor layer 330. The semiconductor layer 330 between the source and drain electrodes 344 and 346 becomes a channel of the thin film transistor Tr. As illustrated in the figure, the channel may have a U-like shape or a shape of the channel may be variously changed.

A gate insulating layer (not shown) is formed between the gate line 312 and the data line 342.

Meanwhile, a common line 316 is formed of the same material and on the same layer as the gate line 312 in the first direction. An auxiliary common line 318 is extended from the common line 316 and is formed in the second direction. A first end of the auxiliary common line 318 is connected to the common line 316, and a second end of the auxiliary common line 318 is extended in the first direction and is disposed in a next pixel region.

A passivation layer (not shown) is formed on the gate line 312, the data line 342, the thin film transistor Tr and the common line 316.

A pixel electrode 362 and a common electrode 372 are formed in the pixel region on the passivation layer.

The pixel electrode 362 includes first and second pixel electrode portions 362a and 362b. Each of the first and second pixel electrode portions 362a and 362b includes a plurality of patterns, which are inclined with a predetermined angle with respect to the first direction and are spaced apart from each other. At this time, the predetermined angle between the first direction and each pattern of the first and second pixel electrode portions 362a and 362b may be less than 45 degrees. When the pixel region is divided into first and second areas adjacent to each other along the second direction, the first pixel electrode portion 362a is disposed in the first area, and the second pixel electrode portion 362b is disposed in the second area.

On the basis of left ends of the first and second pixel electrode portions 362a and 362b in the pixel region in the context of the figure, the first pixel electrode portion 362a is inclined with the predetermined angle counterclockwise with respect to the first direction, and the second pixel electrode portion 362b is inclined with the predetermined angle clockwise with respect to the first direction. As a result, each of the first and second pixel electrode portions 362a and 362b is substantially symmetric with respect to an imaginary line passing through the center of the pixel region along the first direction and has a V shape.

In addition, a first pixel connection portion 364 and a second pixel connection portion 336 are formed on the same layer as the pixel electrode 362. The first pixel connection portion 364 is extended along the second direction and is spaced apart from the data line 342. The first pixel connection portion 364 is connected to ends of the first and second pixel electrode portions 362a and 362b. The second pixel connection portion 366 is connected to an end of the first pixel connection portion 364. The pixel electrode connection portion 366 overlaps the drain electrode 346 and contacts the drain electrode 346 through a drain contact hole 352 formed in the passivation layer.

The first pixel connection portion 364 overlaps the auxiliary common line 318 and the second pixel connection portion 366 overlaps the common line 316 to form a storage capacitor.

The common electrode 372 includes first, second and third common electrode portions 372a, 372b and 372c. Each of the first and second common electrode portions 372a and 372b includes a plurality of patterns, which are inclined with a predetermined angle with respect to the first direction and are spaced apart from each other. At this time, the predetermined angle between the first direction and each pattern of the first and second common electrode portions 372a and 372b may be less than 45 degrees.

The first common electrode portion 372a is disposed in the first area of the pixel region, and the second common electrode portion 372b is disposed in the second area of the pixel region. The patterns of the first common electrode portion 372a alternate with the patterns of the first pixel electrode portion 362a, and the patterns of the second common electrode portion 372b alternate with the patterns of the second pixel electrode portion 362b.

On the basis of left ends of the first and second common electrode portions 372a and 372b in the pixel region in the context of the figure, the first common electrode portion 372a is inclined with the predetermined angle counterclockwise with respect to the first direction, and the second common electrode portion 372b is inclined with the predetermined angle clockwise with respect to the first direction. The third common electrode portion 372c is disposed between the first and second common electrode portions 372a and 372b, and more particularly, is disposed between adjacent patterns of the first and second pixel electrodes 362a and 362b. The third common electrode portion 372c may have a triangle shape. The angular point of the third common electrode portion 372c between the first and second pixel electrode portions 362a and 362b may be extended along the first direction.

The common electrode 372 may be formed of the same material and on the same layer as the pixel electrode 362.

Moreover, a common connection portion 374 is formed on the same layer as the common electrode 372. The common connection portion 374 is extended in the second direction and connects one ends of the first, second and third common electrode portions 372a, 372b and 372c. The first pixel connection portion 364 and the common connection portion 374 are respectively disposed in both sides of the pixel region facing each other along the first direction.

The common connection portion 374 overlaps the common line 316 and contacts the common line 316 through a first common contact hole 354 formed in the passivation layer. In addition, the common connection portion 374 may overlap an extended part of the auxiliary common line 318 and may contact the extended part of the auxiliary common line 318 through a second common contact hole 356 formed in the passivation layer. One of the first and second common contact holes 354 and 356 may be omitted, or another common contact hole in addition to the first and second common contact holes 354 and 356 may be further formed.

Alternatively, the curved LCD device according to the second embodiment of the present invention may have a pixel structure illustrated in FIG. 11B.

In FIG. 11B, a gate line 412 is formed in a first direction, and a data line 442 is formed in a second direction perpendicular to the first direction. The gate line 412 and the data line 442 cross each other to define a pixel region.

A thin film transistor Tr is formed at a crossing portion of the gate line 412 and the data line 442 and is connected to the gate line 412 and the data line 442. The thin film transistor Tr includes a gate electrode 414, a semiconductor layer 430, a source electrode 444 and a drain electrode 446.

The gate electrode 414 is connected to the gate line 412. The gate electrode 414 may be part of the gate line 412 as illustrated in the figure, or the gate electrode 414 may be extended from the gate line 412. The semiconductor layer 430 is disposed between the gate electrode 414 and the source and drain electrodes 444 and 446. The semiconductor layer 430 may include an active layer of intrinsic amorphous silicon and ohmic contact layers of impurity-doped amorphous silicon. Alternatively, the semiconductor layer 430 may be formed of polycrystalline silicon. The source electrode 444 is connected to the data line 442. The source electrode 444 may be extended from the data line 442 with a U-like shape as illustrated in the figure, or the source electrode 444 may be part of the data line 442. The drain electrode 446 is spaced apart from the source electrode 444 over the semiconductor layer 430. The semiconductor layer 430 between the source and drain electrodes 444 and 446 becomes a channel of the thin film transistor Tr. As illustrated in the figure, the channel may have a U-like shape or a shape of the channel may be variously changed.

A gate insulating layer (not shown) is formed between the gate line 412 and the data line 442.

Meanwhile, a common line 416 is formed of the same material and on the same layer as the gate line 412 in the first direction. First and second auxiliary common lines 418 and 419 are extended from the common line 416 and are formed in the second direction. The first and second auxiliary common lines 418 and 419 are respectively disposed in both sides of the pixel region facing each other along the first direction and are spaced apart from the data line 442.

A passivation layer (not shown) is formed on the gate line 412, the data line 442, the thin film transistor Tr and the common line 416.

A pixel electrode 462 and a common electrode 472 are formed in the pixel region on the passivation layer.

The pixel electrode 462 includes first and second pixel electrode portions 462a and 462b. Each of the first and second pixel electrode portions 462a and 462b includes a plurality of patterns, which are inclined with a predetermined angle with respect to the first direction and are spaced apart from each other. At this time, the predetermined angle between the first direction and each pattern of the first and second pixel electrode portions 462a and 462b may be less than 45 degrees. When the pixel region is divided into first and second areas adjacent to each other along the first direction, the first pixel electrode portion 462a is disposed in the first area, and the second pixel electrode portion 462b is disposed in the second area.

On the basis of upper ends of the first and second pixel electrode portions 462a and 462b in the pixel region in the context of the figure, the first pixel electrode portion 462a is inclined with the predetermined angle counterclockwise with respect to the first direction, and the second pixel electrode portion 462b is inclined with the predetermined angle clockwise with respect to the first direction. Therefore, each of the first and second pixel electrode portions 462a and 462b is substantially symmetric with respect to an imaginary line passing through the center of the pixel region along the second direction and has a V shape.

In addition, a first pixel connection portion 464 and a second pixel connection portion 466 are formed on the same layer as the pixel electrode 462.

The first pixel connection portion 464 is extended along the second direction and is disposed between the first and second pixel electrode portions 462a and 462b. The first pixel connection portion 464 connects ends of the first and second pixel electrode portions 462a and 462b. The second pixel connection portion 466 is connected to an end of the first pixel connection portion 464. The second pixel connection portion 466 overlaps the drain electrode 446 and contacts the drain electrode 446 through a drain contact hole 452 formed in the passivation layer.

The second pixel connection portion 466 overlaps the common line 416 to form a storage capacitor.

The common electrode 472 includes first and second common electrode portions 472a and 372b. Each of the first and second common electrode portions 472a and 472b includes a plurality of patterns, which are inclined with a predetermined angle with respect to the first direction and are spaced apart from each other. At this time, the predetermined angle between the first direction and each pattern of the first and second common electrode portions 472a and 472b may be less than 45 degrees.

The first common electrode portion 472a is disposed in the first area of the pixel region, and the second common electrode portion 472b is disposed in the second area of the pixel region. The patterns of the first common electrode portion 472a alternate with the patterns of the first pixel electrode portion 462a, and the patterns of the second common electrode portion 472b alternate with the patterns of the second pixel electrode portion 462b.

On the basis of upper ends of the first and second common electrode portions 472a and 472b in the pixel region in the context of the figure, the first common electrode portion 472a is inclined with the predetermined angle counterclockwise with respect to the first direction, and the second common electrode portion 472b is inclined with the predetermined angle clockwise with respect to the first direction.

The common electrode 472 may be formed of the same material and on the same layer as the pixel electrode 462.

Moreover, a common connection portion 474 is formed on the same layer as the common electrode 472. The common connection portion 474 includes first, second, third and fourth connection patterns 474a, 474b, 474c and 474d. The first connection pattern 474a is extended in the second direction and connects one ends of the patterns of the first common electrode portion 472a. The second connection pattern 474b is extended in the second direction and connects one ends of the patterns of the second common electrode portion 472b. The third connection pattern 474c is extended in the first direction and connects one ends of the first and second connection patterns 474a and 474b. The fourth connection pattern 474d is extended in the first direction and connects the other ends of the first and second connection patterns 474a and 474b. At this time, the first connection pattern 474a and the second connection pattern 474b are respectively disposed in both sides of the pixel region facing each other along the first direction, and the third connection pattern 474c and the fourth connection pattern 474d are respectively disposed in both sides of the pixel region facing each other along the second direction, whereby the common connection portion 474 has a rectangular frame shape.

The third connection pattern 474c overlaps the first auxiliary common line 418 and contacts the first auxiliary common line 418 through a common contact hole 454 formed in the passivation layer. In addition, the fourth connection pattern 474*d* overlaps the second auxiliary common line 419. Although not shown in the figure, the fourth connection pattern 474*d* may contact the second auxiliary common line 419 through a contact hole formed in the passivation layer.

In the second embodiment of the present invention, the curved LCD device has a curved surface along the first direction, and the liquid crystal molecules are initially arranged along the first direction. The pixel electrode 362 and 462 and the common electrode 372 and 472 are inclined with the predetermined angle less than 45 degrees with respect to the first direction. At this time, the liquid crystal molecules have a positive dielectric anisotropy. When a voltage is applied to the pixel electrode 362 and 462 and the common electrode 372 and 472, an electric field is generated in a direction with an angle less than 45 degrees with respect to the second direction, and the liquid crystal molecules are arranged parallel to the electric field.

Here, the angle of the pixel electrode 362 and 462 and the common electrode 372 and 472 with respect to the first direction may be within a range of 7 to 20 degrees to improve response time of the liquid crystal molecules and to increase light transmittance. Namely, if the angle is less than 7 degrees, the response time of the liquid crystal molecules may become slow, and if the angle is more than 20 degrees, the light transmittance may be lowered.

Meanwhile, in the second embodiment of the present invention, the pixel electrode 362 and 462 and the common electrode 372 and 472 are inclined with respect to the first direction. Alternatively, the pixel electrode and the common electrode may be parallel to the first direction. In this case, when a voltage is applied to the pixel electrode and the common electrode, an electric field may be generated along the second direction, and the liquid crystal molecules may be arranged parallel to the second direction.

Improvement in light leakage of the curved LCD device according to the second embodiment of the present invention will be described with reference to FIG. 12.

Figure 12:
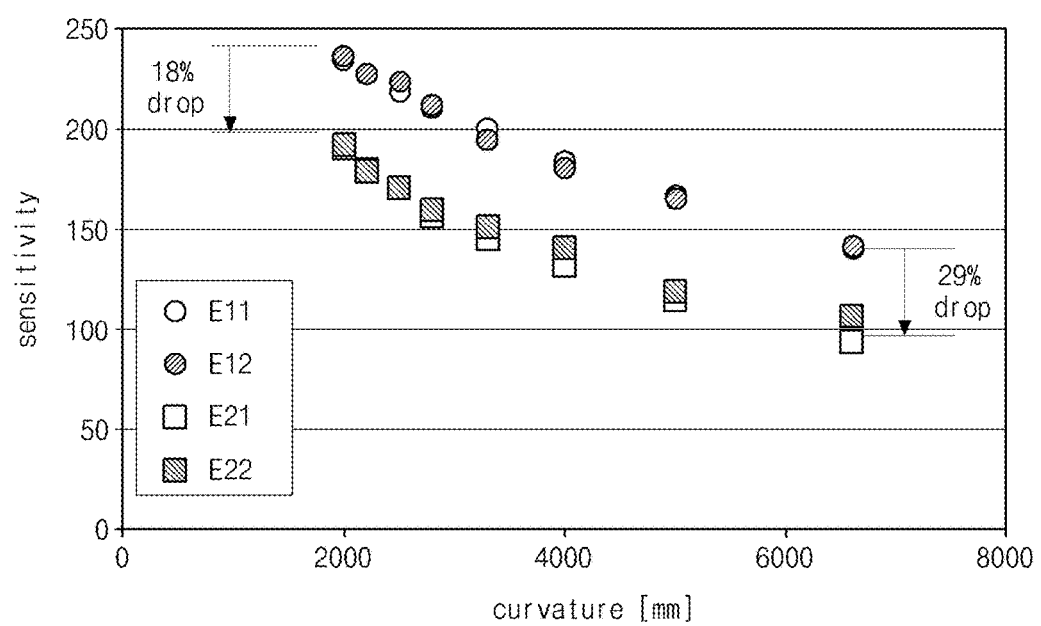
FIG. 12 is a graph showing sensitivity verse curvatures of the curved LCD devices according to the first and second embodiments of the present invention.

FIG. 12 is a graph showing sensitivity verse curvatures of the curved LCD devices according to the first and second embodiments of the present invention. The sensitivity shows light transmittance depending on twist of liquid crystal molecules when stress is applied.

Here, sample1 E11 and sample2 E12 are curved LCD devices according to the first embodiment of the present invention. The sample1 E11 and the sample2 E12 have the curved surfaces in the first direction and the liquid crystal molecules are initially arranged in the second direction. On the other hand, sample3 E21 and sample4 E22 are curved LCD devices according to the second embodiment of the present invention. The sample3 E21 and the sample4 E22 have the curved surfaces in the first direction and the liquid crystal molecules are initially arrange in the first direction. The sample1 E11 and the sample2 E12 are fabricated under substantially the same conditions, and the sample3 E21 and the sample4 E22 are fabricated under substantially the same conditions.

In FIG. 12, the sensitivity of the sample3 E21 or the sample4 E22 is lower than the sensitivity of the sample1 E11 or the sample2 E12 at the same curvature. That is, light leakage in the curved LCD device according to the second embodiment of the present invention is improved by 18% to 29% as compared with light leakage in the curved LCD device according to the first embodiment of the present invention.

In the above-mentioned embodiments, the liquid crystal molecules have a positive dielectric anisotropy. Alternatively, liquid crystal molecules having a negative dielectric anisotropy may be used.

In a curved LCD device according to the third embodiment of the present invention, liquid crystal molecules have a negative dielectric anisotropy. A pixel structure of a curved LCD device according to the third embodiment of the present invention will be described with reference to FIG. 13.

Figure 13:
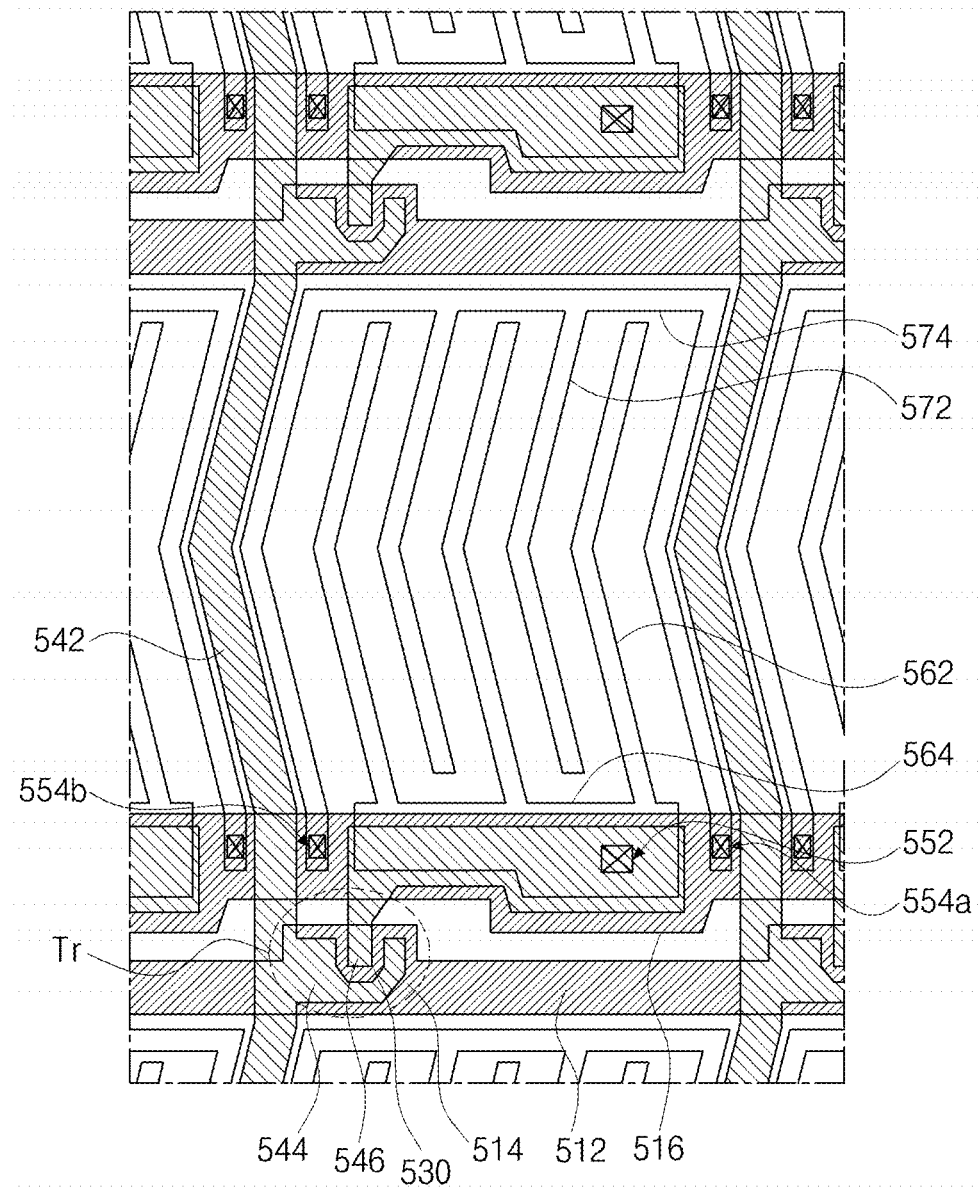
FIG. 13 is a plan view illustrating a pixel structure of a curved LCD device according to the third embodiment of the present invention.

FIG. 13 is a plan view illustrating a pixel structure of a curved LCD device according to the third embodiment of the present invention.

In FIG. 13, a gate line 512 is formed in a first direction, and a data line 542 is formed in a second direction perpendicular to the first direction. The gate line 512 and the data line 542 cross each other to define a pixel region.

A thin film transistor Tr is formed at a crossing portion of the gate line 512 and the data line 542 and is connected to the gate line 512 and the data line 542. The thin film transistor Tr includes a gate electrode 514, a semiconductor layer 530, a source electrode 544 and a drain electrode 546.

The gate electrode 514 is connected to the gate line 512. The gate electrode 514 may be part of the gate line 512 as illustrated in the figure, or the gate electrode 514 may be extended from the gate line 512. The semiconductor layer 530 is disposed between the gate electrode 514 and the source and drain electrodes 544 and 546. The semiconductor layer 530 may include an active layer of intrinsic amorphous silicon and ohmic contact layers of impurity-doped amorphous silicon. Alternatively, the semiconductor layer 530 may be formed of polycrystalline silicon. The source electrode 544 is connected to the data line 542. The source electrode 544 may be extended from the data line 542 with a U-like shape as illustrated in the figure, or the source electrode 544 may be part of the data line 542. The drain electrode 546 is spaced apart from the source electrode 544 over the semiconductor layer 530. The semiconductor layer 530 between the source and drain electrodes 544 and 546 becomes a channel of the thin film transistor Tr. As illustrated in the figure, the channel may have a U-like shape or a shape of the channel may be variously changed.

A gate insulating layer (not shown) is formed between the gate line 512 and the data line 542.

Meanwhile, a common line 516 is formed of the same material and on the same layer as the gate line 512 in the first direction.

A passivation layer (not shown) is formed on the gate line 512, the data line 542, the thin film transistor Tr and the common line 516.

A pixel electrode 562 and a common electrode 572 are formed in the pixel region on the passivation layer. Each of the pixel electrode 562 and the common electrode 572 includes a plurality of patterns, which are spaced apart from each other along the first direction. The patterns of the common electrode 572 are spaced apart from and alternate with the patterns of the pixel electrodes 562 along the first direction. Each pattern of the pixel electrode 562 and the common electrode 572 is bent in the center of the pixel region and has a predetermined angle with respect to the second direction. Each pattern of the pixel electrode 562 and the common electrode 572 is substantially symmetric with respect to an imaginary line passing through the center of the pixel region in the first direction. Here, the pixel electrode 562 and the common electrode 572 are bent with an angle less than 45 degrees with respect to the second direction.

At this time, the data line 542 also has a bent structure corresponding to each pixel region.

In addition, a pixel connection portion 564 and a common connection portion 574 are formed on the same layer as the pixel electrode 562 and the common electrode 572. The pixel connection portion 564 is connected to ends of the patterns of the pixel electrode 562. The pixel connection portion 564 overlaps the drain electrode 546 and contacts the drain electrode 546 through a drain contact hole 552 formed in the passivation layer. At this time, part of the drain electrode 546 overlaps the common line 516 to form a storage capacitor. Moreover, the common connection portion 574 is connected to ends of the patterns of the common electrode 572.

In the meantime, the patterns of the common electrode 572 adjacent to the data line 542 are extended over the common line 516 and contacts the common line 516 through common contact holes 554a and 554b formed in the passivation layer.

In the third embodiment of the present invention, the curved LCD device has a curved surface along the first direction, and the liquid crystal molecules are initially arranged along the first direction. The pixel electrode 562 and the common electrode 572 are bent in the center of the pixel region and have the angle less than 45 degrees with respect to the second direction. At this time, the liquid crystal molecules have a negative dielectric anisotropy. When a voltage is applied to the pixel electrode 562 and the common electrode 572, an electric field is generated in a direction with an angle less than 45 degrees with respect to the first direction, and the liquid crystal molecules are arranged perpendicularly to the electric field.

Here, the bent angle of the pixel electrode 562 and the common electrode 572 with respect to the second direction may be within a range of 7 to 20 degrees to improve response time of the liquid crystal molecules and to increase light transmittance. Namely, if the angle is less than 7 degrees, the response time of the liquid crystal molecules may become slow, and if the angle is more than 20 degrees, the light transmittance may be lowered.

Meanwhile, in the third embodiment of the present invention, the pixel electrode 562 and the common electrode 572 are bent with the predetermined angle with respect to the second direction. Alternatively, the pixel electrode and the common electrode may be parallel to the second direction. In this case, when a voltage is applied to the pixel electrode and the common electrode, an electric field may be generated along the first direction, and the liquid crystal molecules may be arranged along the second direction perpendicular to the electric field.

In the above-mentioned embodiments, the curved LCD devices have the curved surfaces along the first direction. Alternatively, a curved LCD device may have a curved surface along the second direction. When the curved LCD device has a curved surface along the second direction, liquid crystal molecules are initially arranged along the second direction. Namely, an initial arrangement of the liquid crystal molecules is in accordance with a curved direction of the device. At this time, when the liquid crystal molecules have a positive dielectric anisotropy, the curved LCD device, beneficially, has the pixel structure illustrated in FIG. 13. When the liquid crystal molecules have a negative dielectric anisotropy, the curved LCD device, beneficially, has the pixel structure illustrated in FIG. 11A or FIG. 11B.

In the meantime, in the above-mentioned embodiments, the curved LCD devices are landscape types, in which a length in the transverse direction is longer than a length in the longitudinal direction. Alternatively, the present invention may be applied to portrait type devices, in which a length in the longitudinal direction is longer than a length in the transverse direction.

That is, in a portrait type curved LCD device, when a curved surface is formed along a first direction of the transverse direction, the liquid crystal molecules are initially arranged along the first direction. On the other hand, when a curved surface is formed along a second direction of the longitudinal direction, the liquid crystal molecules are initially arranged along the second direction. At this time, the pixel structure may be selected from those illustrated in FIG. 11A, FIG. 11B and FIG. 13 depending on positive or negative dielectric anisotropy of the liquid crystal molecules. Here, the gate line may be formed in the first direction, or the data line may be formed in the first direction.

In a curved LCD device according to an embodiment of the present invention, the distance from the main viewing point of the viewer to the center of the curved LCD device is the same as the distance from the main viewing point to the left or right side of the curved LCD device, and the distance deviation can be reduced or prevented. Accordingly, the sense of immersion of the viewer can be improved.

Moreover, the curved direction is in accordance with an initial arrangement of the liquid crystal molecules, and the liquid crystal molecules are twisted with a relatively smaller twist angle in the corners of the device. Thus, light leakage can be reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A curved liquid crystal display (LCD) device, comprising:
    first and second substrates having curved surfaces with a curvature along a first direction;
    first and second alignment layers on inner surfaces of the first and second substrates, respectively;
    a pixel electrode and a common electrode in a pixel region on the first substrate and alternating with each other;
    a liquid crystal layer between the first and second alignment layers; and
    a seal pattern in an edge area surrounding the liquid crystal layer between the first and second substrates,
    wherein the first and second alignment layers have an alignment direction substantially parallel with the curvature along the first direction to orient long axes of the liquid crystal molecules of the liquid crystal layer along the curvature of the first direction,
    wherein when a voltage is applied to the pixel electrode and the common electrode and an electric field is generated between the pixel electrode and the common electrode, the long axes of the liquid crystal molecules are arranged according to a direction of the electric field, substantially following the curvature on a surface of the first substrate in the pixel region.

2. The curved LCD device according to claim 1, wherein the liquid crystal molecules have a positive dielectric anisotropy, and when a voltage is applied to the pixel electrode and the common electrode, an electric field is generated in a direction parallel to a second direction that is substantially perpendicular to the first direction or in a direction with an angle less than 45 degrees with respect to the second direction.

3. The curved LCD device according to claim 2, wherein the pixel electrode and the common electrode are inclined with an inclined angle less than 45 degrees with respect to the first direction.

4. The curved LCD device according to claim 3, wherein the inclined angle of the pixel electrode and the common electrode is within a range of 7 to 20 degrees.

5. The curved LCD device according to claim 3, wherein each of the pixel electrode and the common electrode is substantially symmetric with respect to a line passing through a center of the pixel region along the first direction or the second direction.

6. The curved LCD device according to claim 3, wherein the pixel electrode includes first and second pixel electrode portions, each of which includes a plurality of patterns, wherein the common electrode includes first and second common electrode portions, each of which includes a plurality of patterns, and wherein the patterns of the first pixel electrode portion alternate with the patterns of the first common electrode portion and the patterns of the second pixel electrode portion alternate with the patterns of the second common electrode portion.

7. The curved LCD device according to claim 6, wherein the common electrode further includes a third common electrode portion that is disposed between the first and second common electrode portions and between adjacent patterns of the first and second pixel electrode portions.

8. The curved LCD device according to claim 7, wherein the third common electrode portion has a substantially triangle shape.

9. The curved LCD device according to claim 6, further comprising a pixel connection portion extended along the second direction and connecting the first and second pixel electrode portions.

10. The curved LCD device according to claim 1, wherein the liquid crystal molecules have a negative dielectric anisotropy, and when a voltage is applied to the pixel electrode and the common electrode, an electric field is generated in a direction parallel to the first direction or in a direction with an angle less than 45 degrees with respect to a second direction that is perpendicular to the first direction.

11. The curved LCD device according to claim 10, wherein each of the pixel electrode and the common electrode is bent in a center of the pixel region with a bent angle less than 45 degrees with respect to the second direction.

12. The curved LCD device according to claim 11, wherein the bent angle of the pixel electrode and the common electrode is within a range of 7 to 20 degrees.

13. The curved LCD device according to claim 11, wherein each of the pixel electrode and the common electrode is substantially symmetric with respect to a line passing through a center of the pixel region along the first direction.

* * * * *